United States Patent [19]

Schandl

[11] Patent Number: 5,050,028

[45] Date of Patent: Sep. 17, 1991

[54] RESILENT TENSION SENSOR PIN FOR MAGNETIC TAPE GUIDANCE

[75] Inventor: Hartmut Schandl, Villingen, Fed. Rep. of Germany

[73] Assignee: Deutsche Thomson-Brandt GmbH, Villingen-Schwenningen, Fed. Rep. of Germany

[21] Appl. No.: 411,152

[22] Filed: Sep. 22, 1989

[30] Foreign Application Priority Data

Oct. 27, 1988 [DE] Fed. Rep. of Germany ....... 3836621

[51] Int. Cl.$^5$ ............... G11B 15/60; B65H 27/00; B65H 23/32
[52] U.S. Cl. ............... 360/130.23; 242/76; 226/198; 226/199
[58] Field of Search ............... 360/130.21, 130.22, 360/130.23; 226/198, 199; 242/76

[56] References Cited

U.S. PATENT DOCUMENTS

| 4,379,517 | 4/1983 | Miyakawa et al. | 360/130.32 |
| 4,520,411 | 5/1985 | Ohshima | 360/130.23 |
| 4,814,910 | 3/1989 | Kaku et al. | 360/85 |

FOREIGN PATENT DOCUMENTS

| 0083932 | 6/1983 | European Pat. Off. | |
| 60-93659 | 5/1985 | Japan | 360/130.21 |
| 6093659 | 5/1985 | Japan | 360/130.21 |
| 6038712 | 9/1986 | Japan | 360/130.21 |
| 842950 | 7/1981 | U.S.S.R. | 360/130.21 |

OTHER PUBLICATIONS

Magnetic Tape Storage Technique (Handbook) Dr. Ing. C. Scholz, 1980, p. 278.

Primary Examiner—Aristotelis Psitos
Assistant Examiner—Jefferson Evans
Attorney, Agent, or Firm—Joseph S. Tripoli; Joseph J. Laks; Henig: Sammy S.

[57] ABSTRACT

In a video recorder, a guidance arrangement for guiding a running-in segment of a magnetic tape located at an entrance to a head drum includes a tape tension sensing pin. The pin is mounted on a tape tension lever. A flange mounted on the pin by means of a pressure spring is slidable relative to the lever. The flange causes the tape to be fed to a guide roller in a running-in angle that is the same for tapes of different degrees of rigidness.

6 Claims, 4 Drawing Sheets

RESILENT TENSION SENSOR PIN FOR MAGNETIC TAPE GUIDANCE

The invention relates to a magnetic tape recorder.

Magnetic tape recorders for video recording require high relative speeds between the magnetic tape and the recording-reproducing head. In the well known helical-scan system, the tape is pulled out of a video cassette and wound around a rotating head drum in a helical loop. In order to scan the recording tracks, each having a width of only a few microns, a precise tape guidance is desirable. Such precise tape guidance is desirable at the head drum, at a tape segment running in or approaching the head drum and at a tape segment running away, or leaving the head drum.

FIG. 1 illustrates a tape transport that utilizes a prior art tape guidance. A magnetic tape 111 is, for example, pulled out of a supply wheel of a video cassette 5 and passes on to a head drum 6. A running-in segment of tape 111 of FIG. 1 is defined herein as the segment between an exit of cassette 5 and an entrance of drum 6. Tape 111 is fed from cassette 5 via a deviating pin 114, via a pin 112 that is mounted on a tape tension sensor lever 113, via a first vertical position guide 14 having, for example, a flange guide, via an erasing head 7 and via an idler or a guide roller 8 that is laid against head drum 6. Guide roller 8 may also include a flange guide, thus forming a second vertical position guide. Typically, the vertical positions of both vertical position guides are adjusted by means of screw spindles and remain firmly fixed during operation.

In order to obtain a desirable tape-to-head contact and a stable tape run at a run-in or entrance of the head drum without unnecessarily increasing the overall tape tension, the lower edge of the tape may be tensed tighter. This is explained in U.S. Pat. No. 4,379,517, entitled MAGNETIC TAPE RUNNING SYSTEM in the names of Miyakawa et al., and in a European Patent Specification No. E 0083932, entitled SIGNAL RECORDING/REPRODUCING APPARATUS, the inventors being Nagai et al. This may lead to a sabre-shaped curving of the running-in segment of the tape, between cassette 5 and drum 6, such that one of the two edges of the tape is tensed more tightly than the other one.

A radius of curvature of tape 111, in addition to being dependent on the extent of the tape tension, is also dependent upon the rigidness of the particular tape used. In case of insufficient vertical position compensation by the first vertical position guide, such as guide 14, the tape may be curved, as explained before. The curvature of the tape causes the value of a running-in angle, formed between, for example, a lower edge of tape 111 and a longitudinal axis of guide roller 8 to be different than 90°. Consequently, the edge of the tape may be pressed by screw motion onto the guide flange of, for example, guide roller 8 by excessively high force and is, disadvantageously, overstretched.

FIGS. 2a-2c illustrate the effect on tape 111 of each of three hypothetical different three tape guidance arrangements shown for explanation purposes only and placed in the running-in segment of tape 111 of FIG. 1. Similar numerals and symbols in FIGS. 1 and 2a-2c indicate similar items or functions.

In the tape guidance arrangement of FIG. 2b, guide 14 of FIG. 1 does not have a flange. Therefore, a stress is, disadvantageously, imposed on a lower edge of tape 111 in the vicinity of an auxiliary flange 9 that is affixed to guide roller 8 because magnetic tape 111 is "bent" downward. The stress is dependent on the rigidness of tape 111.

In the guide arrangement of FIG. 2c, guide 14 of FIG. 1 has a fixed vertical position, during operation. Guide 14 of FIG. 2b is equipped with a flange 66 on which a lower edge of magnetic tape 111 rests. The fixed vertical position of flange 66 provides a guide elevation at guide 14 that is the same for a rigid tape, defining an edge line 111(a) and shown in solid line, and for less rigid or soft tape, defining an edge 111(b) and shown by a broken line. Disadvnatageously, different feed-in or running-in angles $a_1$ and $a_2$ between the corresponding edge, 111(a) or 111(b), and an axis 8a of guide roller 8 result for the two different types of tape rigidness.

With the vertical position of the flanges firmly fixed, an optimum tape guidance can be obtained, disadvantageously, only, for example, for one type of tape rigidness. It may be desirable to improve the tape guidance in the running-in segment of the tape for different types of tape rigidness.

By comparison to the arrangements of FIGS. 2b and 2c, FIG. 2a illustrates a hypothetical ideal tape guidance arrangement in which guide 14 is adjustable in its vertical position during operation in a manner not shown. Auxiliary flange 9 affixed to guide roller S is at the same level as flange 66 of guide 14 in such a way that a lower edge of magnetic tape 111 is perpendicular to axis 8a of guide roller 8.

In accordance with a feature of the invention, a resilient flange that resiliently supports the lower edge of the tape is incorporated into a tape tension sensing pin that is attached to a tape tension sensor. By incorporating the resilient flange into the tape sensing pin, the first one of the aforementioned vertical position guides may be eliminated. By omitting the first one of the position guides, the cost is reduced.

To perform its function, the tape tension sensor is, typically, an easily movable element. Therefore, had the flange that is incorporated into the tape tension sensing pin been fixed in the vertical direction, it could not have been positioned precisely enough at the tape tension sensing pin. Therefore, the guide flange is fitted on the pin by an operation of a spring.

The flange resiliently moves the edge of the tape in the vertical direction. The resiliency associated with the guide flange compensates for the curvature or bending of the tape in a direction that is perpendicular to the direction of the tape movement. Because the tape tension is regulated, an improved running-in angle can be obtained over an arrangement in which a fixed guide is used.

An apparatus, embodying an aspect of the invention, for guiding of a segment of a magnetic tape to a feed-in entrance side of a head drum of a magnetic tape recorder includes a tape tension lever. A tape tension sensing pin is fitted on the lever for engaging the tape segment and for varying a position of the lever in accordance with a tension formed in the tape segment so as to regulate the tension in accordance with the position of the lever as the tape segment is being pulled out of a tape supply reel. A flange is fitted on the tension sensing pin for engaging an edge of the tape segment. A resilient arrangement engages the flange for resiliently varying a vertical position of the flange and, thereby of the edge of the tape segment relative to the lever by a spring action of the resilient arrangement. A guide roller engages the tape segment as the tape segment approaches the entrance side of the head drum.

Figure 3:
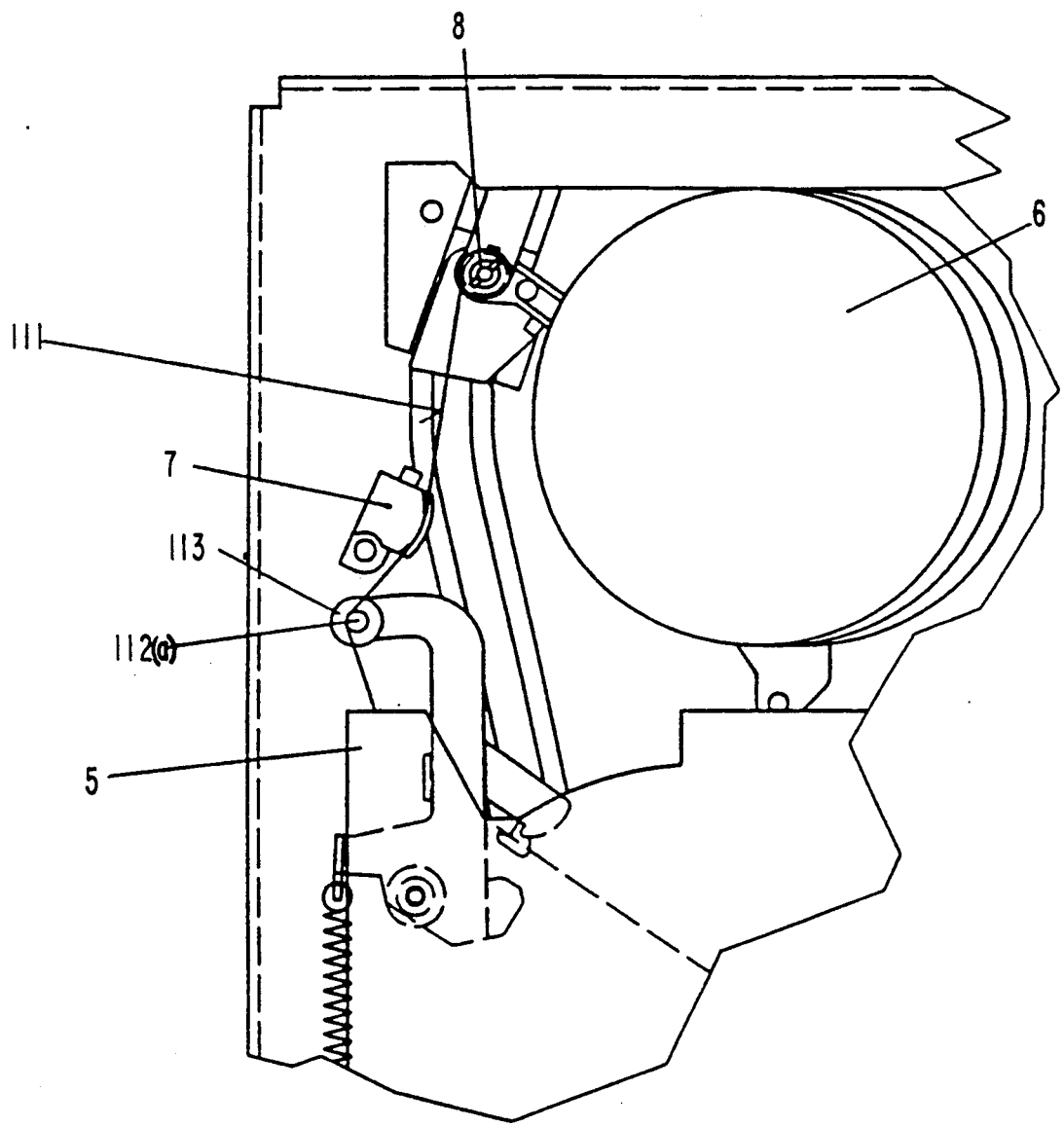
FIG. 3 illustrates a tape transport that utilizes a tape guidance embodying an aspect of the invention.

FIG. 3 illustrates a tape transport embodying an aspect of the invention. Similar symbols and numerals in FIGS. 1 and 3 indicate similar items or functions. Tape 111 of FIG. 3 is fed or pulled out of a supply reel of cassette 5 and passes to head drum 6. Tape 111 passes via a resilient, vertical guide 112(a), embodying a feature of the invention, via head 7 and via guide roller 8 that is laid against head drum 6.

Figure 1:
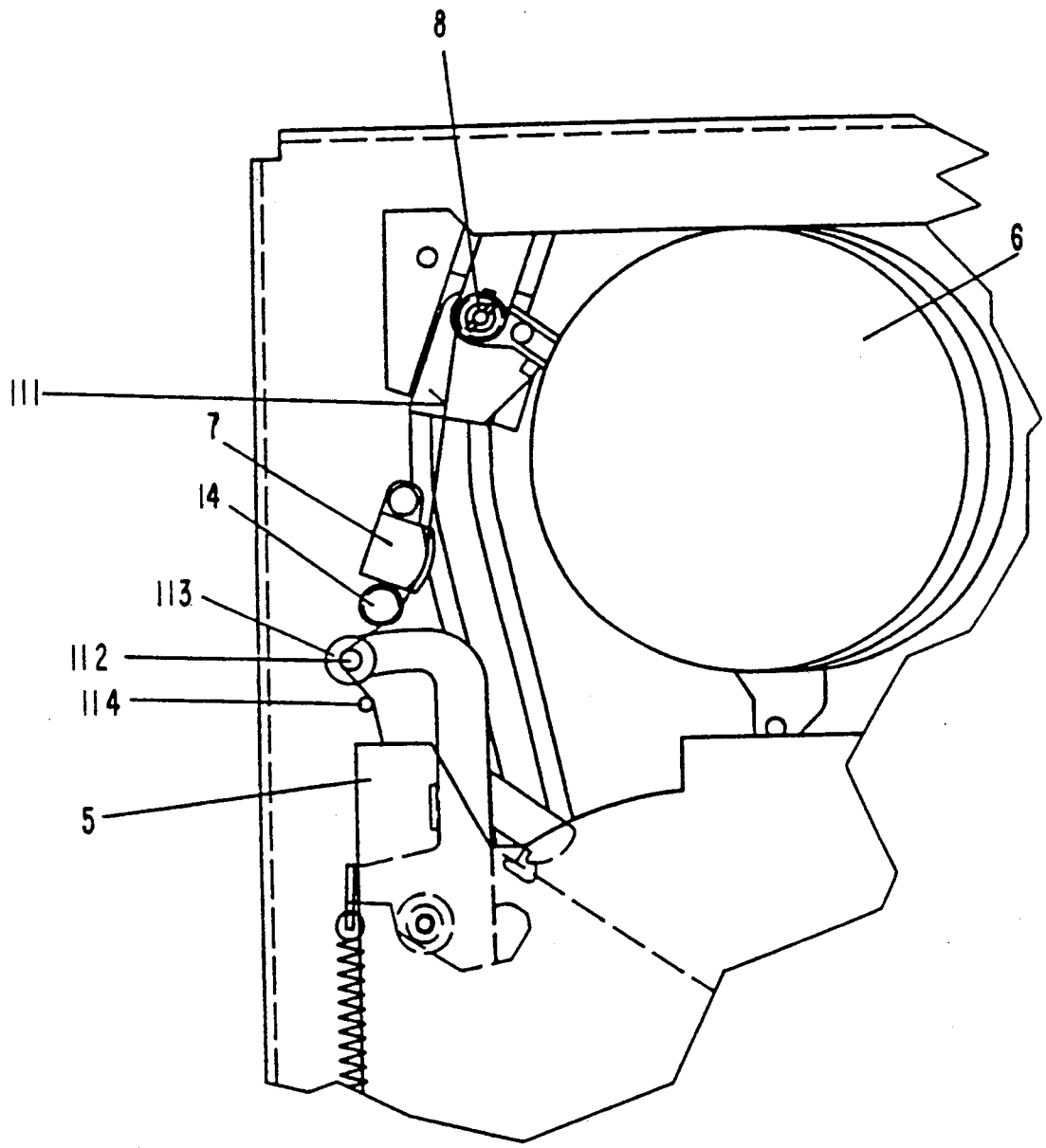
FIG. 1 illustrates a tape transport that utilizes a prior art tape guidance.
Figure 2:
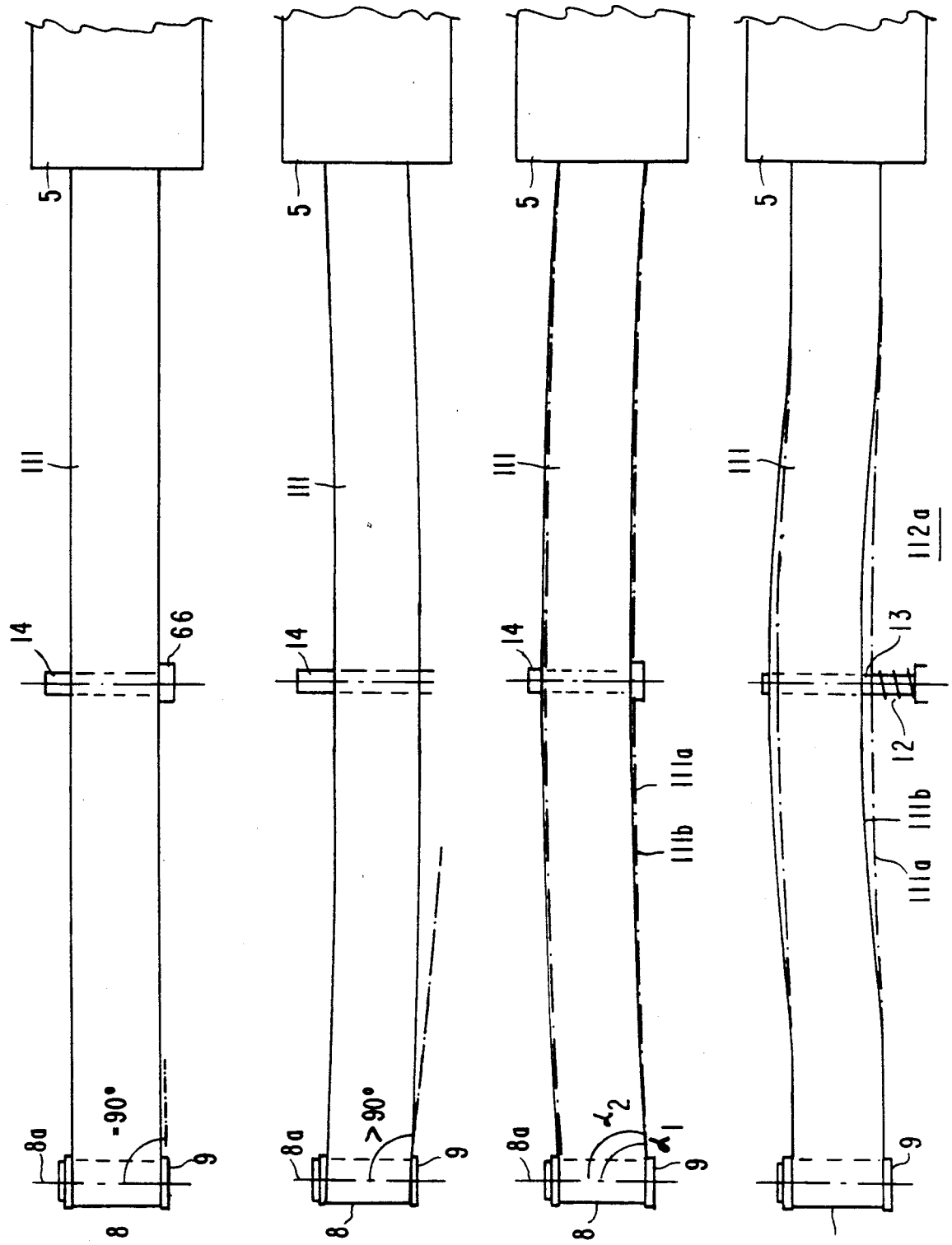
FIGS. 2a-2d illustrate different effects on the tape caused by utilizing different types of tape guidances, positioned in the running-in segment of the tape at the entrance to the head drum.

FIG. 2d illustrates the effect of resilient guide 112(a) of FIG. 3 on the running-in angle. Similar numerals and symbols in FIGS. 1, 2a-2d and 3 indicate similar items or functions. In the guidance arrangement of FIG. 2d, different degrees of tape rigidness associated with different types of tapes are compensated by a spring 12. Advantageously, the same or constant running-in angle results for both types of tape rigidity by the spring action of spring 12. Spring 12 vertically adjusts, in a dynamic manner and according to the degrees of tape rigidness, the vertical position of a flange 13 of guide 112(a) in relation to the vertical position of guide roller 8.

In accordance with a feature of the invention, vertical guide 112(a) is installed on tape tension sensor lever 113. Therefore, unlike in the arrangement of FIG. 1, no additional vertical guide such as guide 14 of FIG. 1 is required in the arrangement of FIG. 3.

Figure 4:
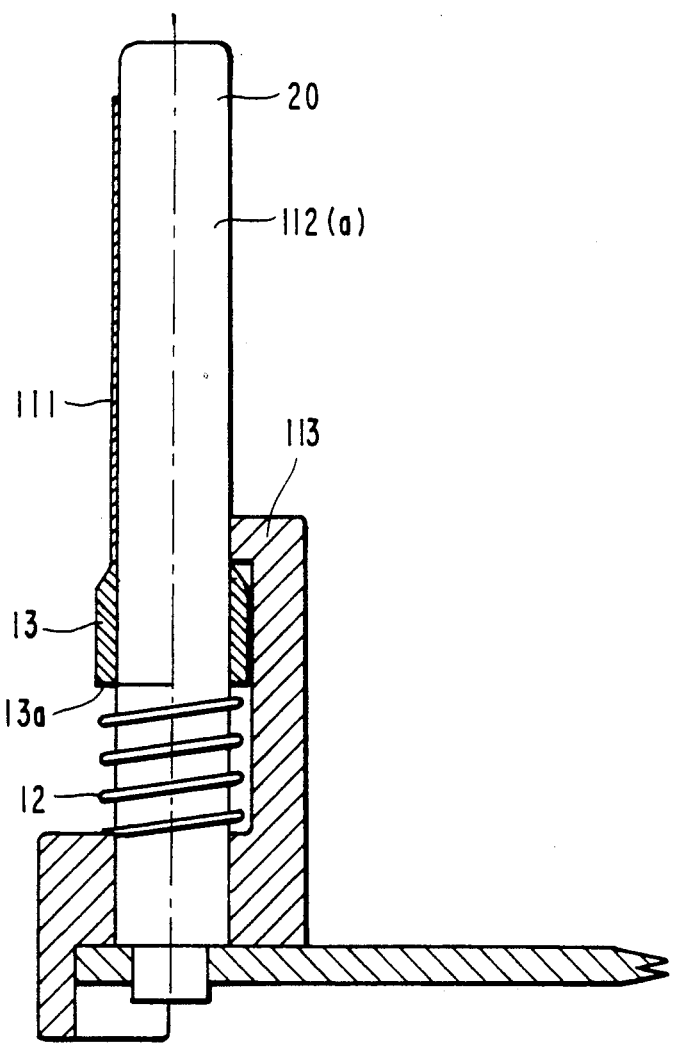
FIG. 4 illustrates a tape guidance of FIG. 3 that includes a resilient tape tension sensing pin, embodying an aspect of the invention.

FIG. 4 illustrates a partial cross section of guide 112(a) of FIG. 3. Similar numerals and symbols in FIGS. 1, 2a-2d, 3 and 4 indicate similar items or functions. A shaft or pin 20 of guide 112(a) of FIG. 4 is firmly affixed on tape tension sensor lever 113 of FIG. 3. Flange 13 of FIG. 4 is slidably movable on pin 20 of guide 112(a). The lower edge 111(a) or 111(b) of magnetic tape 111 of FIG. 2d rests on the top portion of flange 13 of FIG. 4. A bottom portion 13a of flange 13 is flexibly adjusted in the vertical direction by pressure spring 12. The lower end of spring 12 is abutting against tape tension sensor lever 113.

In an alternative arrangement, flange 13 may be firmly affixed to pin 20, instead of being slidably movable. In such an alternative arrangement, pin 20 of guide 112(a) may be slidably movable relative to tape tension sensor lever 113 by the spring pressure of pressure spring 12.

What is claimed is:

1. An apparatus for the guiding of a segment of a magnetic tape to a feed-in entrance side of a head drum of a magnetic tape recorder, comprising:
   a tape tension lever;
   a tape tension sensing pin being fitted on said lever for engaging said tape segment and for varying a position of said lever in accordance with a tension formed in said tape segment so as to regulate said tension in said tape segment as said tape segment is being pulled out of a tape supply reel;
   a flange fitted on said tension sensing pin for engaging an edge of said tape segment; and
   resilient means engaging said flange for resiliently varying by a spring action a position of said flange in a direction that is generally perpendicular to a direction of a motion of said tape segment and, thereby, of said edge of said tape segment relative to said lever, wherein said tension sensing pin is movable in said perpendicular direction relative to said lever in accordance with said spring action of said resilient means.

2. An apparatus according to claim 1 wherein said flange is slidably fitted on said tension sensing pin for slidably moving said flange relative to said pin in said direction that is generally perpendicular to said direction of said motion of said tape segment in accordance with said spring action of said resilient means.

3. An apparatus according to claim 1 wherein said magnetic tape recorder operates by the helical-scan system.

4. An apparatus according to claim 1 further comprising, a guide roller for engaging said tape segment at a location that is between said tension sensing pin and said head drum as said tape segment approaches said entrance side of said head drum.

5. An apparatus according to claim 4 wherein no other tape guide is required between said tension sensing pin and said guide roller.

6. An apparatus according to claim 4 wherein said spring action causes a feed-in angle of said magnetic tape at said guide roller to be the same by varying degrees of rigidity of magnetic tapes that are used.

* * * * *